United States Patent [19]
Cotton

[11] 3,893,352
[45] July 8, 1975

[54] VARIABLE RATIO TRANSMISSION TRAINS

[76] Inventor: George Albert Cotton, 1 Machpelah, Hebden Bridge, England

[22] Filed: Sept. 27, 1973

[21] Appl. No.: 401,451

[30] Foreign Application Priority Data
Oct. 27, 1972 United Kingdom............... 49624/72

[52] U.S. Cl. ...................... 74/768; 74/786; 74/793
[51] Int. Cl. ............................................. F16h 3/44
[58] Field of Search ............ 74/786, 768, 782, 790, 74/774, 769, 793, 794

[56] References Cited
UNITED STATES PATENTS

| | | | |
|---|---|---|---|
| 2,001,036 | 5/1935 | Prince.................................. | 74/768 |
| 2,618,175 | 11/1952 | Bruce.................................. | 74/786 |
| 2,960,890 | 11/1960 | Davis .................................. | 74/786 |
| 3,447,400 | 6/1969 | Serniuk............................... | 74/782 |
| 3,563,113 | 2/1971 | Harvey................................ | 74/786 |

*Primary Examiner*—Samuel Scott
*Assistant Examiner*—Allan R. Burke
*Attorney, Agent, or Firm*—Norris & Bateman

[57] ABSTRACT

A variable ratio transmission gear comprises an input shaft drivably connected to a first member of a first planetary gearset, an output shaft drivably connected via a second planetary gearset to a second member of the planetary gearset, a third member of the first planetary gearset drivably connected to a variable resistance hydraulic screw pump for controlling the speed of rotation of the third member of the first planetary gearset and control means for controlling the rate of fluid flow through the pump between a free, neutral, driving position, rate of flow and a pre-determined, restricted, driving position, rate of flow.

5 Claims, 4 Drawing Figures

VARIABLE RATIO TRANSMISSION TRAINS

This invention relates to a variable ratio transmission gear having one or more epicyclic gear trains.

According to the invention, a variable ratio transmission gear comprises an input shaft drivably connected to a first member of a first planetary gearset, an output shaft drivably connected to a second member of the first planetary gearset, a third member of the first planetary gearset drivably connected to a variable resistance hydraulic screw pump for controlling the speed of rotation of the third member of the first planetary gearset and control means for controlling the rate of fluid flow through the pump.

A gearbox incorporating the invention, and intended to be fitted between the engine crankshaft and the cardan shaft of a motor vehicle, will now be described by way of example, with reference to the accompanying drawings, in which.

Figure 1:
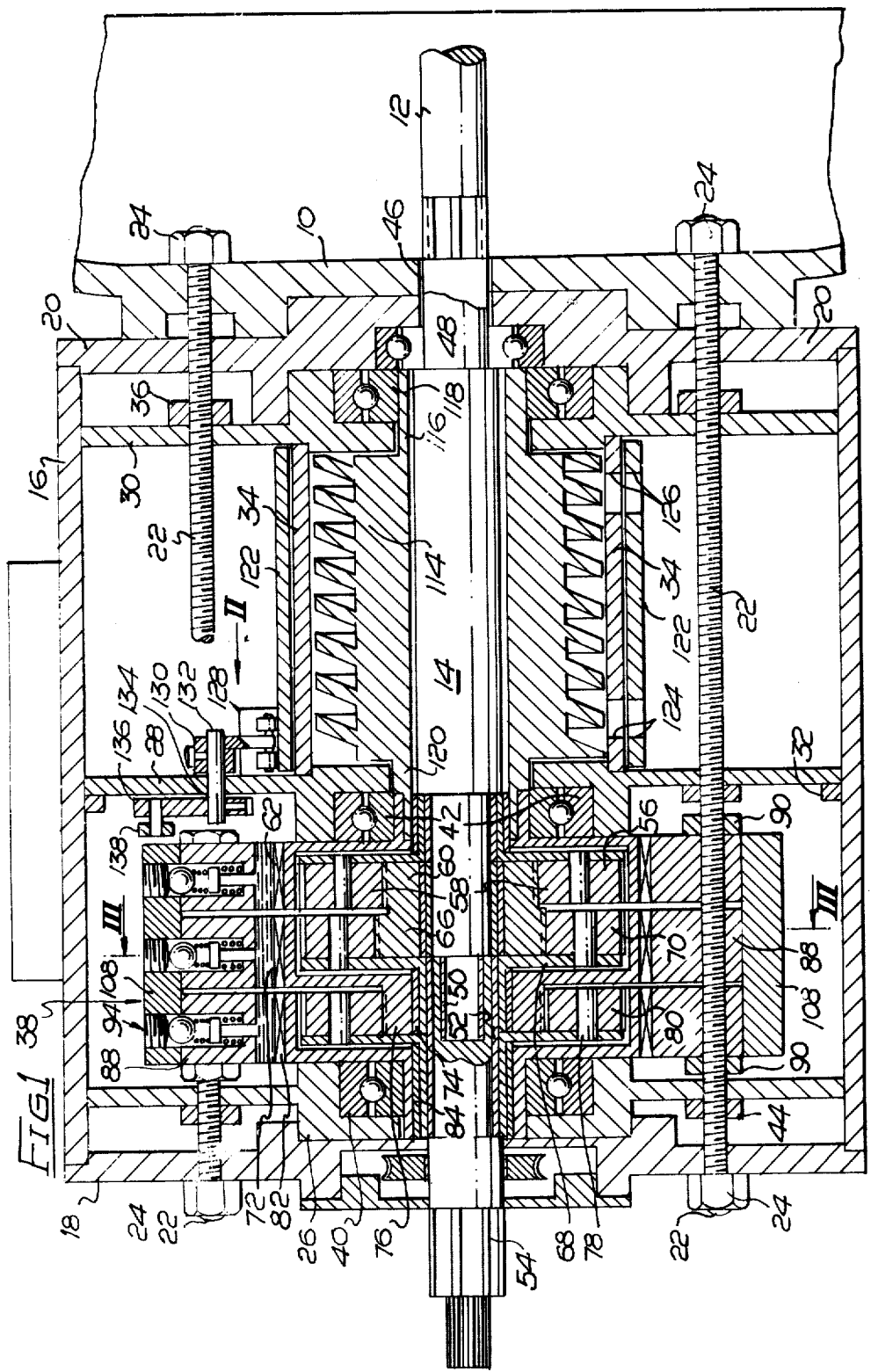
FIG. 1 is a sectional elevation through the gearbox.

The gearbox is secured to the conventional bell housing 10 which is normally provided for the vehicle clutch, but in practice, the clutch is removed and replaced by a short connecting shaft 12 which is adapted to transmit rotary motion directly from the crankshaft (not shown) to an input shaft 14 of the gearbox.

The gearbox has a casing which comprises a cylindrical wall 16 secured between two end covers 18 and 20, by long studs 22 which pass through the covers 18 and 20 and through the bell housing 10. Nuts 24 engage on the ends of the studs 22 and clamp the whole assembly together. In this way, the gearbox is also secured on to the bell housing. If it is required to gain access to the interior of the gearbox, the box is removed from the clutch housing, the end cover 18 or 20 is removed, and it is then possible to withdraw parts through the open end. It is to be understood however, that the casing could be constructed in a variety of ways; for example, it could take the form of a casing divided longitudinally and the two parts bolted together, to enable one part to be lifted off the other.

Three bearing housings 26, 28 and 30 are provided inside the casing, and each of these housings is in the form of an annular plate with a boss at the centre. The bearing housing 28 is pressed against one side face of an annular lip 32 projecting inwardly from the cylindrical wall 16, and a fixed tube 34 provides a distance piece between the housing 28 and the housing 30. Nuts 36 engaging on screw-threaded portions of the studs 22 press the housing 30 towards the housing 28, and in this way, the two housings 28 and 30 are secured in the casing in longitudinally spaced relationship. In addition, the housings 28 and 30 are sealed against the inside of the cylindrical wall 16 for a purpose which will appear hereinafter.

An assembly of planetary gearsets train, indicated generally at 38 is positioned between the bearing housings 26 and 28, and there are combined thrust and journal bearings 40 and 42 housed respectively in the bosses of the housings 26 and 28. The assembly of the planetary gearsets 38 provides a spacer between the bearings housings 26 and 28, and the housing 26 is located by nuts 44 engaging on screw-threaded portions of the studs 22 and pressing the housing 26 towards the housing 28.

Figure 4:
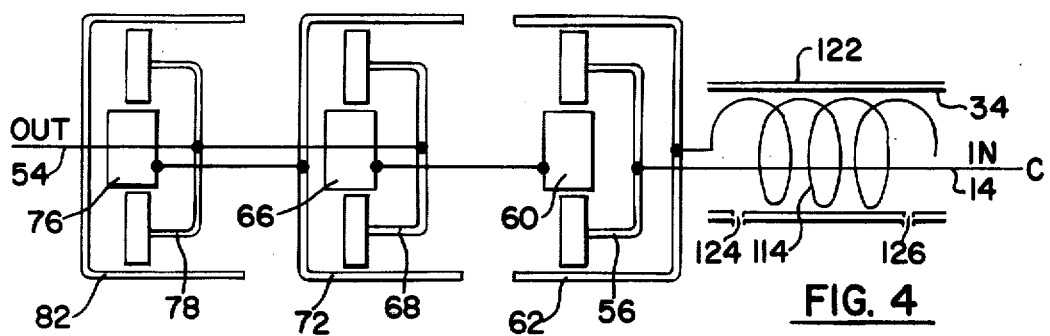
FIG. 4 is a diagrammatic representation of the transmission gearing illustrating the interconnection of key parts.

Referring to FIGS. 1 and 4, the assembly of planetary gearsets 38 comprises three planetary gearsets each having a sun gear, three planet gears rotatably mounted on a planet carrier and a ring gear. The input shaft 14 passes through an aperture 46 in the bell housing 10, is journalled in a bearing 48 in the cover 20 and extends from the housing 30 through the housing 28 into the first and second planetary gearsets of the assembly of planetary gearsets 38. The end of the input shaft 14 remote from the connecting shaft 12 is of reduced diameter and is rotatably journalled in a bearing 50 mounted in a bore 52 in one end of an output shaft 54. The output shaft 54 is co-axial with the input shaft 14 and extends through a third planetary gearset of the assembly of planetary gearset 38, the housing 26, and the end cover 18 to project a short distance therefrom. The other end of the output shaft 54 projecting from the end cover 18 is adapted to be connected in conventional manner to a cardan shaft (not shown). The portion of the input shaft 14 passing through the bearing 42 is provided with external splines which drivably engage with internal splines on a hub of a first planet carrier 56 of the first planetary gearset. The first planet carrier 56 has three equi-angularly spaced apart first planet gears 58 rotatably mounted thereon each of which mesh with external gear teeth formed on a first sun gear 60 and internal gear teeth formed on a first ring gear 62 of the first planetary gearset. The hub portion of the first ring gear 62 is journalled upon the bearing 42 mounted on the external surface of the hub portion of the first planet carrier 56 and is journalled within the bearing 42 in the housing 28.

The second planetary gearset of the gear train indicated generally at 38 comprises a second sun gear 66 which is formed integrally with, and is of larger ratio than, the first sun gear 60 of the first planetary gearset. A second planet carrier 68 has three equi-angularly spaced apart second planet gears 70 rotatably mounted thereon which each mesh with the external teeth of the second sun gear 66 and with the internal teeth of a second ring gear 72. Both the first and second sun gears 60 and 66 are rotatably journalled on a bearing on the end of the input shaft 14 adjacent to the output shaft 54. The hub portion of the second planet carrier 68 is provided with internal splines which drivably engage with external splines formed on the end portion of the output shaft 54 adjacent to the input shaft 14. The hub portion of the second ring gear 72 is journalled on a bearing 74 on the external surface of the hub portion of the second planet carrier 68 and external teeth 76 are provided on the external surface of the hub portion of the second ring gear 72 and form a third sun gear for the third planetary gearset of the gear train 38.

The third planetary gearset of the gear train 38 also comprises a third planet carrier 78 having three equi-angularly spaced apart third planet gears 80 which each mesh with the external teeth of the third sun gear 76 and with internal teeth of a third ring gear 82. The hub portion of the third planet carrier 78 is provided with internal splines which drivably engage with external splines formed on the output shaft 54. The hub portion of the third ring gear 82 is journalled upon a bearing 84 mounted on the external surface of the hub portion of the third planet carrier 78 and is journalled within the bearing 40 in the housing 26.

Figure 3:
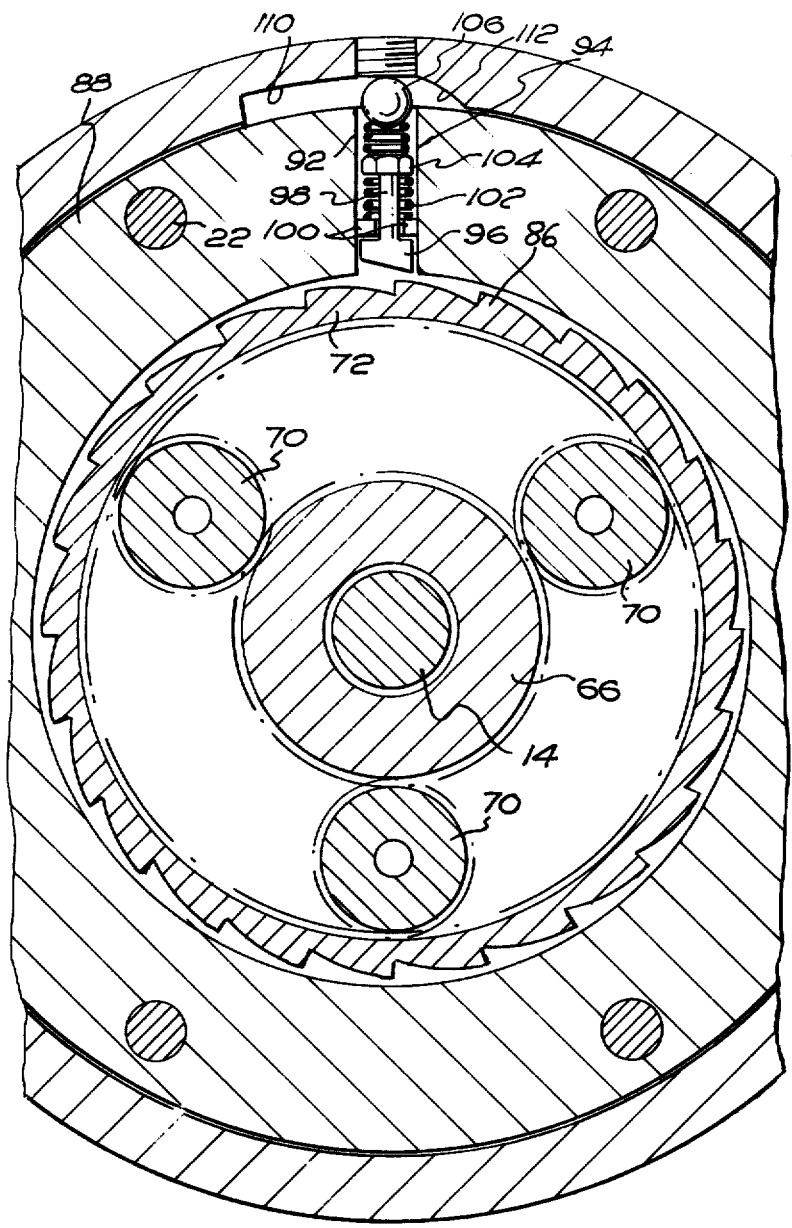
FIG. 3 is a section taken on the line III—III in FIG. 1.

The first, second and third ring gears 62, 72 and 82 are each provided with a series of ratchet teeth 86 on their external surface, see FIG. 3 of the drawings. Three annular rings 88 are mounted on the studs 22 and clamped between nuts 90 on the screw-threaded portion of the studs 22 so that each of the rings 88 is co-axial with and axially aligned with the associated one of the three ring gears 62, 72 and 82. Each annular ring 88 is provided with a radial bore 92 in which is mounted a pawl device indicated generally at 94 for selectively engaging the ratchet teeth 86 on the ring gear associated therewith to prevent rotation of said ring gear in one direction.

The pawl device indicated generally at 94 comprises a pawl 96 formed integrally at one end of a rod 98 which extends radially outwards and is slidable within the bore 92 in the associated annular ring 88. The bore 92 has a reduced diameter portion 100 adjacent to its inner end and a helical compression spring 102 surrounding the rod 98 is confined endwise between the reduced diameter portion 100 and a collar 104 secured at or adjacent to the outer end of the rod 98. The spring 102 urges the pawl 96 radially outwards relative to the ratchet teeth 86 on the external surface of the associated one of the ring gears 62, 72 and 82 so that the pawl 96 is normally disengaged from the teeth 86. Each pawl device 94 has a ball bearing 106 engageable with the outer end of the rod 98. The ballbearing 106 projects a short distance beyond the outer end of the radial bore 92 and is slidable therewithin to move the rod 98 against the action of the spring 102 to engage the pawl 96 with the ratchet teeth 86.

A sleeve 108, co-axial with and extending over the external surface of the three annular rings 88, is angularly pivotable about its longitudinal axis relative to said rings. Three arcuate grooves 110 are formed on the internal surface of the sleeve 108 and are each aligned with an associated one of the radial bores 92 in the annular rings 88 so that the ball bearings 106 are slidable therein. The groove 110 associated with the pawl device 94 adapted to engage the ratchet teeth on the first ring gear 62 is provided with sloping portions 112 at each end so that when the sleeve 108 is pivoted relative to the ring 88 in either direction, the ball bearing 106 is pressed into the bore 92 and the first ring gear 62 is prevented from rotating. The two grooves 110 associated with the second and third ring gears 72 and 82 are provided with sloping portions 112 at one end only so that when the sleeve 108 is pivoted in one direction the pawl device 94 engages the ratchet teeth 86 on the second ring gear 72 and prevents rotation thereof whilst the third ring gear 82 is free to rotate and when the sleeve 108 is pivoted in the other direction the annular gear 82 is prevented from rotating whilst the second ring gear 72 remains free to rotate.

The lengths of the grooves 110 are selected so that initial pivotal movement of the sleeve 108 in said one direction prevents rotation of the second ring gear 72 and further rotation of the sleeve 108 in the same direction additionally prevents rotation of the first ring gear 62; whilst initial pivotal movement of the sleeve 108 in the other direction prevents rotation of the third ring gear 82 and further rotation of the sleeve in the same direction additionally prevents rotation of the first ring gear 62.

A cylindrical worm 114 is mounted co-axially of the input shaft 14 for rotation within the fixed tube 34 between the housings 28 and 30 and has a reduced diameter end portion 116 adjacent to the housing 30 which is journalled in a bearing 118 in said housing. A reduced diameter end portion 120 of the worm 114 adjacent to the housing 28 is drivably connected to the hub portion of the first ring gear 62. An angularly rotatable tube 122 is mounted on the fixed tube 34 co-axial therewith for relative rotation thereon under the action of an operating mechanism (not shown). The portion of the gearbox between the housings 28 and 30 forms a reservoir for hydraulic fluid so that the cylindrical worm 114 is immersed therein. Inlet ports 124 and outlet ports 126 are formed in the rotatable tube 122 and fixed tube 34 and when the tube 122 is in a "neutral" position the ports 124 and 126 therein are aligned with the ports 124 and 126 in the fixed tube 34 so that the hydraulic fluid can be freely pumped therethrough by rotation of the worm 114. Rotation of the tube 122 relative to the fixed tube 34 causes the ports 124 and 126 to move out of alignment and become constricted, thereby increasing the force required to rotate the worm 114.

Figure 2:
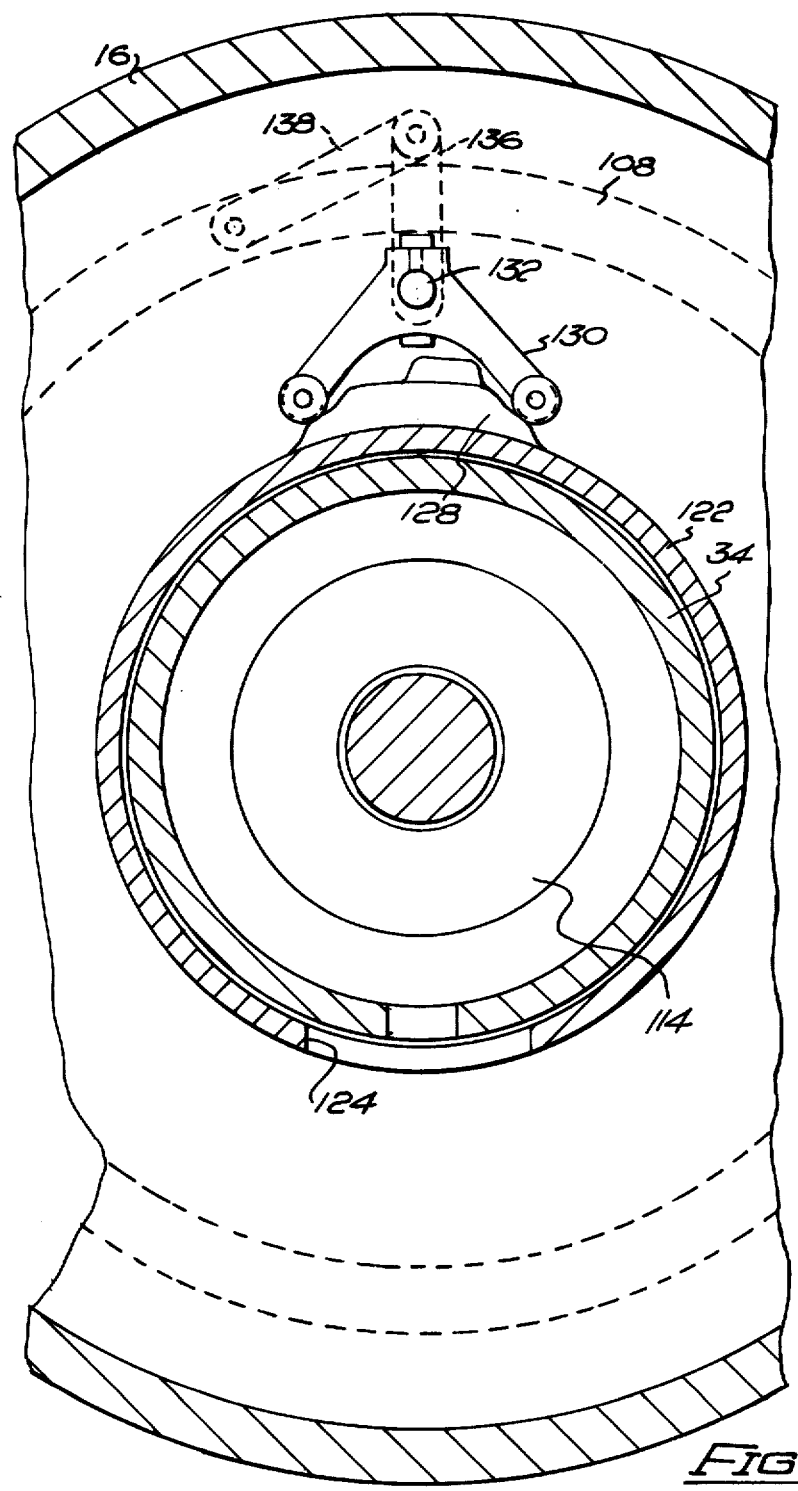
FIG. 2 is a detail looking in the direction of arrow II in FIG. 1.

Referring now to FIGS. 1 and 2 of the drawings, the tube 122 has a projection 128 formed on its external surface adjacent to the housing 28, said projection being located between the arms of a bi-furcated member 130 mounted on one end of a shaft 132 rotatably mounted in and extending through a bore 134 in the housing 28. The end of the shaft 132 adjacent to the planetary gear train indicated generally at 38 is connected to one end of an arm 136 extending radially therefrom. The other end of the arm 136 is pivotally connected to one end of a link 138 which is pivotally connected at its other end to the sleeve 108. Pivotal movement of the tube 122 by the operating mechanism (not shown) in either direction relative to the tube 34 causes the projection 128 to engage one of the arms of the bi-furcated member 130, pivoting the shaft 132 about its longitudinal axis and causing the arm 136 and the link 138 to rotate the sleeve 108 relative to the annular rings 88.

When the gearbox is in neutral, drive is transmitted through the connecting shaft 12 and the input shaft 14 to the first planet carrier 56 causing said carrier to rotate. The sleeve 108 is positioned so that the three ring gears 62, 72 and 82 are not engaged by their associated pawl devices 94 and are free to rotate. Considering the first planetary gearset, although the first planet carrier 56 is rotated, the first ring gear 62 is free to rotate as the tube 122 is positioned relative to the tube 34 so that the inlet and outlet ports 124, 126 are fully open and the worm 114 can freely pump fluid from the inlet port 124 through the outlet port 126, and thus no drive is transmitted to the first sun gear 60.

In addition, even if there is a small amount of resistance to rotation of the worm 114 created by pumping fluid through the open ports 124, 126; the second and third ring gears 72 and 82 are freely rotatable and thus no drive is transmitted to the second planet carrier 68 via the integral first and second sun gears 60, 66 or to the third planet carrier 78 of the third planetary gearset via the first and second planetary gearsets.

FIG. 4 shows diagrammatically the operation of the transmission gearing through the worm pump 114 from the input shaft 14 to the putput shaft 54.

With the control lever in neutral, the tube 122 is rotated to fully open the ports 124 and 126 to provide air unrestricted flow.

For a forward drive, the control mechanism is moved to engage the ring gear 72, and the tube 122 is rotated through a predetermined angle to partially close the ports 124, 126 to allow restricted flow through the ports. The ports remain in this predetermined fixed position until the control is again operated to again select neutral or another drive position.

As the speed of the input shaft is raised, the resistance of the pump 114 rises and the speed of the output shaft rises. If the load on the output shaft increases (as when going up hill) the speed of the output shaft will fall and the ring gear 62 will rotate faster and lower the gear ratio of the epicyclic gear and the resistance of the hydraulic pump will rise. As the load on the output shaft falls and is returned to normal the speed of the ring gear is automatically returned and the speed of the hydraulic pump falls to restore the original condition and the unit therefore automatically adjusts the gear ratios according to the driving conditions without the employment of manual or govenor operation.

For a reverse drive the tube 122 is rotated through a predetermined angle in the opposite direction with the ring gear 82 engaged, the operation being as described for the forward drive but in the reverse direction.

In order to provide an overdrive i.e. a direct drive from the input shaft 14 to the output shaft 54, the ring gear 62 is engaged by the control mechanism to lock the gears to provide a constant gear ratio between the input and output shafts with the hydraulic or worm pump inoperative.

In order to engage forward gear, the operating mechanism (not shown) rotates the tube 122 relative to the tube 34 initially causing the sleeve 108 to rotate relative to the rings 88 so that the pawl device 94 associated with the second ring gear 72 engages with the ratchet teeth 86 thereon and prevents rotation of this second ring gear 72 but the other two ring gears 62 and 82 remain free to rotate. The initial movement of the tube 122 relative to the tube 34 does not cause any constriction of the inlet or outlet ports 124, 126 and so even though forward gear has been selected the gearbox remains in neutral with no drive being transmitted to the output shaft 54, as the first ring gear 62 is still freely rotatable. Further rotary movement of the tube 122 relative to the tube 34 progressively causes restriction of the inlet and outlet ports 124, 126. The back pressure created as the worm 114 pumps hydraulic fluid through the restricted outlet port 126 reduces the speed of rotation of the worm 114 and the first ring gear 62. This resistance to rotation of the first ring gear 62 causes drive to be transmitted from the first planet carrier 56 and the first planet gears 58 to the first sun gear 60 which commences to rotate. The second sun gear 66 formed integrally with the first sun gear 60 also rotates and as the second ring gear 72 is prevented from rotating, as hereinbefore described, the planet carrier 68 of the second planetary gearset rotates and drives the output shaft 54 secured thereto.

At this point, the worm 114 and the annular gear 62 are prevented further movement of the sleeve 108 relative to the annular rings 88 due to said sleeve being connected, as hereinbefore described, to the tube 122 causes the pawl device 94 associated with the first ring gear 62 to engage the ratchet teeth 86 on the first ring gear 62 and additionally prevent rotation of the first ring gear 62 as well as the second ring 72. In this condition, the ratio of the gearbox is determined by the ratio of the second sun gear 66 to the first sun gear 60 which in this example is greater than 1:1 for providing an overdrive ratio.

When a reverse gear ratio is required, the tube 122 is returned by the operating mechanism (not shown) from the forward position to the neutral condition and is then rotated in the opposite direction relative to the tube 34. The sleeve 108 is then also rotated in the opposite direction so that the third ring gear 82 is engaged and prevented from rotating by the pawl device 94 in the ring 88 associated therewith, but the annular gear 72 remains free to rotate. Further movement of the tube 122 relative to the tube 34 causes restriction of the inlet and outlet ports 124, 126 and produces rotation of the first and second sun gears 60, 66 as previously described for forward motion. The second planet carrier 68 is connected to the output shaft 54. Drive is transmitted to the second ring gear 72 which rotates in the opposite direction to the direction of rotation of the second sun gear 66. The third sun gear 76 of the third planetary gearset formed on the hub portion of the second ring gear 72 also rotates and as the third ring gear 82 is prevented from rotating, the third planet carrier 78 and the output shaft 54 drivably connected thereto are rotated in the opposite direction to the input shaft 14.

It will be realised that the input shaft 14 can equally well be connected to any one of the members of the first planetary gearset, not only the first planet carrier but also the first sun gear or the first ring gear thereof. The worm 114 can also be connected to any one of the members of the first planetary gearset which is not connected to the input shaft 14.

In a modification, the third planetary gearset of the gear train 38 is replaced by a conventional separately selectable reverse gear mechanism or alternatively the third planetary gearset is omitted and the second ring gear of the second planetary gearset is selectively connectable directly to the output shaft 54 and the second planet carrier is selectively disconnected from the output shaft 54 and is prevented from rotating in order to provide reverse gear ratio.

What I claim is:

1. A variable ratio transmission gear comprising an input shaft, a first planetary gearset having a first member mounted coaxially of the input shaft and drivably connected to said input shaft, a second planetary gearset mounted coaxially with the first planetary gearset and having a first member drivably connected to a second member of the first planetary gearset, an output shaft co-axial with said input shaft and drivably connected to said second member of the second planetary gearset, a variable resistance hydraulic fluid worm pump carried on and coaxial with the input shaft drivably connected to a third member of the first planetary gearset, a stationary tube defining a chamber within which the worm of said pump rotates and a rotatable tube surrounding the stationary tube, ports in the tubes adapted to be brought into selective registry by rotation of said rotatable tube whereby rotation of the rotatable tube may selectively vary the effective overlapping areas of the ports from an open neutral position to a constant flow restricting driving position, and engaging means for preventing rotation of a third member of the second planetary gearset whereby when the rotatable tube is in said driving position and the third member of the second planetary gearset is engaged by said engaging means drive power is transmitted from said input shaft to said output shaft when the input shaft is rotated.

2. The variable ratio transmission gear defined in claim 1 wherein said first member of the first planetary gear set is a planet gear carrier, the second member of the first planetary gear set is a sun gear, and the third member of the first planetary gear set is a ring gear; and the first member of said second planetary gear set is a sun gear drivably connected to said sun gear of the first planetary gear set, said second member of the second planetary gear set is a planet carrier drivably connected to said output shaft, and the third member of said second planetary gear set is a ring gear.

3. The variable ratio transmission defined in claim 2 wherein said engaging means comprises pawl and detent locking means for selectively locking said ring gear of the second planetary gear set against rotation.

4. The variable ratio transmission defined in claim 2, wherein means is provided for selectively locking the ring gear of the first planetary gear set against rotation.

5. The variable ratio transmission defined in claim 2, wherein a third planetary gear set has a sun gear drive connected to the planet gear carrier of said second planetary gear set, a planet gear carrier drive connected to the output shaft, and a ring gear with means for selectively locking said ring gear against rotation.

* * * * *